US011999543B1

(12) United States Patent
Ovadia et al.

(10) Patent No.: US 11,999,543 B1
(45) Date of Patent: Jun. 4, 2024

(54) OPEN DETECTION FOR PACKAGES USING MULTIPLE SENSOR ORIENTATION COMPARISON

(71) Applicant: SensosLabz.io Ltd, Herzliya (IL)

(72) Inventors: Eyal Ovadia, Tel Aviv (IL); Ori Inbar, Brookline, MA (US); Tal Kanonich, Herzliya (IL); Tal Singer, Philadelphia, PA (US)

(73) Assignee: SENSOSLABZ.IO LTD, Herzeliya (IL)

( * ) Notice: Subject to any disclaimer, the term of this patent is extended or adjusted under 35 U.S.C. 154(b) by 0 days.

(21) Appl. No.: 18/381,769

(22) Filed: Oct. 19, 2023

(51) Int. Cl.
*B65D 55/02* (2006.01)
*G08B 13/14* (2006.01)

(52) U.S. Cl.
CPC ........... *B65D 55/026* (2013.01); *G08B 13/14* (2013.01); *B65D 2401/00* (2020.05)

(58) Field of Classification Search
CPC ... B65D 55/026; B65D 2401/00; G08B 13/14
See application file for complete search history.

(56) References Cited

U.S. PATENT DOCUMENTS 6,459,375 B1 * 10/2002 Wallace ............. A47G 29/1214 340/569
6,769,611 B2 * 8/2004 Miller ..................... G07F 17/13 235/382
6,895,241 B2 * 5/2005 Hara ........................ G07C 9/33 455/352
7,116,233 B2 * 10/2006 Zhurin ................... B65D 25/00 119/61.5
7,398,915 B1 * 7/2008 Pineda-Sanchez .......................... A47G 29/1214 340/569
7,714,708 B2 * 5/2010 Brackmann ............... B60P 3/14 180/290
8,174,557 B2 * 5/2012 Kieffer ................... H04N 23/51 348/14.05
9,063,164 B1 * 6/2015 Yuen .................... G01C 22/006
10,074,247 B1 * 9/2018 Tang .................. G08B 21/0275
10,198,057 B2 * 2/2019 Bae ........................ G06F 1/3293
10,262,319 B1 * 4/2019 Benkreira ............ G06Q 20/354
11,250,652 B2 * 2/2022 Sengstaken, Jr. .. G06K 7/10366
11,361,603 B1 * 6/2022 Ismail ...................... A47J 47/14
11,830,331 B2 * 11/2023 Doyle .................... G08B 13/06
(Continued)

*Primary Examiner* — Curtis J King
(74) *Attorney, Agent, or Firm* — PEARL COHEN ZEDEK LATZER BARATZ LLP

(57) ABSTRACT

A wireless package-mounted sensor system to detect an opening of a package. The system may measure, at each of a plurality of sensors mounted to a plurality of different respective surfaces of the package, an orientation of the surface onto which the sensor is mounted. At least one of the sensors may be mounted to an adjustable surface intended to open the package. An open package test may be executed comprising determining a relative orientation between the sensor mounted to the adjustable surface and another of the plurality of sensors mounted to another of the plurality of different respective surfaces, and determining the package is open if the relative orientation changes from a threshold range indicating a closed state to a threshold range indicating an open state. An indication of the determination that the package is open may be wirelessly transmitting.

18 Claims, 6 Drawing Sheets

(56) References Cited

U.S. PATENT DOCUMENTS

2002/0121543 A1* 9/2002 Simmons ........... A47G 29/1212 232/17
2005/0122220 A1* 6/2005 Staples .............. A47G 29/1214 340/569
2006/0214349 A1* 9/2006 Defosse ........... G07B 17/00661 271/2
2006/0224355 A1* 10/2006 Morrison ........... G06Q 30/0185 702/173
2007/0057804 A1* 3/2007 Appleyard ......... G08B 21/0202 340/689
2008/0245791 A1* 10/2008 Atherton .............. B65D 5/4233 340/572.1
2008/0297346 A1* 12/2008 Brackmann ............. G01S 19/35 340/572.1
2010/0265068 A1* 10/2010 Brackmann ............. G01S 19/48 340/572.1
2010/0308066 A1* 12/2010 Perry ..................... B65D 51/20 220/378
2011/0210030 A1* 9/2011 Londo .................. G08B 13/126 229/102
2012/0203498 A1* 8/2012 Fleischman ............. G06F 21/86 702/150
2013/0048667 A1* 2/2013 Wieser ................. A47K 10/421 221/282
2014/0075178 A1* 3/2014 Trethewey .............. G06F 9/448 713/100
2014/0111333 A1* 4/2014 Haas ...................... G08B 23/00 340/539.11
2015/0283028 A1* 10/2015 Intini ................... B65D 43/162 206/438
2015/0327012 A1* 11/2015 Bian ................. H04M 1/72457 455/456.1
2016/0082208 A1* 3/2016 Ballam ............. A61M 16/0003 128/200.14
2017/0075740 A1* 3/2017 Breaux ................. H04W 48/04
2017/0101237 A1* 4/2017 Capous .................. B65D 43/22
2017/0369207 A1* 12/2017 Kugler ..................... B65D 5/42
2018/0029760 A1* 2/2018 Maser .................... B65D 43/16
2018/0346213 A1* 12/2018 High .................. B65D 63/1009
2019/0000255 A1* 1/2019 Dehner ............ G08B 13/19695
2019/0021393 A1* 1/2019 Novak ..................... G06F 3/044
2019/0246194 A1* 8/2019 Aase .................... H04R 25/305
2020/0051015 A1* 2/2020 Davis ................. G06Q 10/0833
2020/0074526 A1* 3/2020 Bikumala .......... G06Q 30/0633
2020/0134554 A1* 4/2020 Bikumala .......... G06Q 10/0837
2020/0138225 A1* 5/2020 Martin ................... B65D 55/02
2020/0372318 A1* 11/2020 Bryant ................. B65D 55/028
2021/0215482 A1* 7/2021 Fonk ...................... B65D 79/02
2021/0243019 A1* 8/2021 Adari ................. G06Q 10/0833
2021/0406818 A1* 12/2021 Adler ..................... G06Q 50/30
2022/0055809 A1* 2/2022 Polycarpe .............. B65D 79/02
2022/0187155 A1* 6/2022 Eichhorn ............ G01M 3/3209
2022/0408973 A1* 12/2022 Pierre .................. A47J 41/005
2023/0130945 A1* 4/2023 Sanchez-Olea ........ B65D 59/04 340/5.8
2023/0152288 A1* 5/2023 Armitage ........... G01N 33/0009 340/855.1
2023/0210295 A1* 7/2023 Anderson ............... F24S 20/60 340/10.1

* cited by examiner

OPEN DETECTION FOR PACKAGES USING MULTIPLE SENSOR ORIENTATION COMPARISON

FIELD OF THE INVENTION

Embodiments of the present invention relate generally to the field of supply chain tracking. In particular, some embodiments of the invention relate to automatic detection of open or breached packages using smart sensors.

BACKGROUND OF THE INVENTION

State-of-the-art techniques for detecting opening, tampering or other breaches of packages include using tamper-evident seals, magnetic sensors and light sensors.

A tamper-evident seal is a physical seal that needs to be cut or irreparably altered to open a package. Tamper-evident seals are thus single-use detectors that cannot detect multiple opening and closing events. Tamper-evident seals may further be circumvented by opening another entry point of the package and are generally visible along the seam of the package and difficult to hide.

Light sensors trigger an open or tamper event when they are exposed to light indicating a light breach inside a package. Light exposure, however, may be caused by light leaks such as package punctures or tears rendering light sensors prone to false alarms. Light sensors are also placed inside a package, so a shipper must open the package, which may risk security or may be prohibited for sterile packages.

Magnetic sensors measure the presence of magnetic flux (a hall effect sensor). Magnetic sensors detect a magnet that moves away (or closer) to a sensor, but may be effected by external magnetic fields (or the magnet area not being the one that is moved for opening).

Power-consumption management often presents a challenge to maintain power to electronic wireless sensors, for example, especially for extended delivery times.

Accordingly, there is a longstanding need in the art for detection of open or breached packages that is accurate (e.g., minimizes false alarms) and efficient (e.g., minimizes power-consumption).

SUMMARY OF THE INVENTION

Embodiments of the invention overcome this longstanding need inherent in the art by providing a wireless package-mounted sensor system that detects if a package is open or closed. The wireless sensor system comprises two or more (N) sensors, such as, accelerometers or gyroscopes, configured to independently detect orientation. Each sensor may be attached to a different package surface, with at least one of the sensors attached to a package flap or other opening. For example, one sensor is attached to a side surface of the package body and another one or more sensor(s) are attached to one or more respective foldable flap(s) (e.g., as shown in FIGS. 1A-2B). When the package is closed (e.g., FIG. 1A), the two or more (N) sensors are mounted to the package in a relative orientation of a "closed" state (e.g., at a 90 degree angle or perpendicular to each other). When the package is opened (e.g., FIGS. 1B, 2B), the package flap rotates together with its mounted sensor, changing the relative orientation of the sensors from the closed state to a different relative orientation of an "open" state (e.g., non-perpendicular). The sensor system may monitor absolute or relative sensor orientations, changes therein or any measure derived therefrom, to detect a change from the closed state to the open state. The specific relative orientations of the closed and open package states may depend on package shape, number and/or placement of sensors, how the flap opens, etc. and may be defined by user-selectable system parameters to suit specific usage. For example, to reduce false alarms, an open state may be defined when the relative tilt angle between sensors is greater than a user-selectable amount (e.g., 30 degrees or more relative to the perpendicular closed state). The sensor system detecting the opening state may trigger an alarm or report indicating an open package event or a closed package event, e.g., together with a package identification (ID) code.

A system, device, method and non-transitory computer-readable storage medium comprising instructions that when executed cause one or more processors to accurately and efficiently detect opening of a package by measuring, at each of a plurality of sensors mounted to a plurality of different respective surfaces of the package, an orientation of the surface onto which the sensor is mounted. At least one of the sensors may be mounted to an adjustable surface intended to open the package. An open package test may be executed comprising determining a relative orientation between the sensor mounted to the adjustable surface and another of the plurality of sensors mounted to another of the plurality of different respective surfaces, and determining the package is open if the relative orientation changes from a threshold range indicating a closed state to a threshold range indicating an open state. An indication of the determination that the package is open may be wirelessly transmitting.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
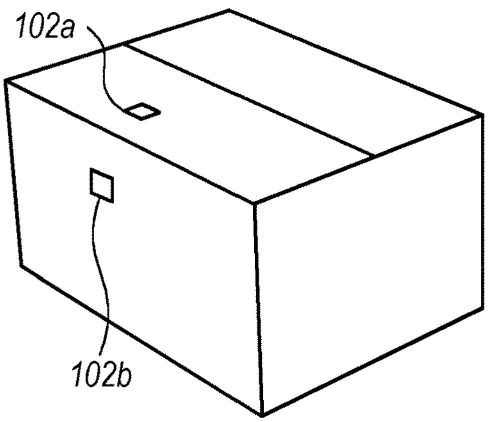
FIGS. 1A-1B schematically illustrate a dual sensor system for detecting opening of a package from a closed state (FIG. 1A) to an open state (FIG. 1B), according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Embodiments of the invention provide a wireless package-mounted sensor system configured to mount onto a package to determine whether the package is open or closed. The sensor system may include a plurality of sensors configures as one contiguous package-mounted device (e.g., see FIG. 2A) or a plurality of different separate package-mounted devices (e.g., see FIG. 1A). Each sensor may be configured to independently measure orientation, position, angle, acceleration, and/or change therein or other derivatives thereof, of the individual sensor and therefore of the surface onto which the sensor is mounted. The sensor system may comprise wired and/or wireless communication circuits for each sensor to communicate with each other and/or a remote server or cloud system. In the embodiment shown in FIG. 1A, each sensor is configured as an individual package-mounted device comprising its own wireless communication circuit, whereas in the embodiment shown in FIG. 2A, two sensors are disposed in a single package-mounted device connected to each other by respective wired communication circuits, and wirelessly connected to a remote server by a single wireless communication circuit.

Each sensor may be mounted to a different surface of the package, where at least one of the sensors is mounted to an adjustable surface intended to open, such as, a flap or lid. Opening the adjustable surface changes the relative orientation of its mounted sensors relative to other surface-mounted sensors, e.g., causing a different relative orientation, angle and/or position, between the closed state and the open state. The relative orientations of the sensors in the closed state and open state depend on the package geometry, where the sensor device(s) are mounted, how the movable surface opens, system parameters (e.g., a minimum opening surface angle such as 30°), etc. The sensor system repeatedly and synchronously measures the orientation at each of the plurality of sensors. The sensor system may execute an "open package" test which is a combined multi-sensor comparison test to determine the relative orientation of different surface-mounted sensors to each other. The open package test may comprise comparing the different sensors' synchronized respective orientation readings, determining a relative orientation between the sensors based on those readings, and comparing that relative orientation to open and/or closed thresholds or parameters to determine if the package is in the open or closed state.

In some embodiments, to reduce power consumption, the open package test may only be executed upon a positive result from a relatively lower power consumption "tilt test." The tilt test may be a single sensor test (e.g., executed at each of one, a subset of, or all of the system's sensors). The tilt test may measure the orientation of the individual sensor to determine if the package is tilted (e.g., deviating along two dimensions, such as X and Z, perpendicular to the mounting surface by more than respective or combined threshold(s) from the initial mounted state). Sensor tilt may be due to a flap sensor tilting when a package opens or the entire package tilting without opening, for example, when the package is moved, flipped or hit. Accordingly, the tilt test is a necessary, but not sufficient, condition for determining package opening (e.g., providing a potentially opened or breached result, where the open package test subsequently confirms). In some embodiments, the sensor system may comprise a dual-processor including (a) a relatively higher power processor (e.g., a CPU) for executing the more complex multi-sensor open package test and (b) one or more relatively lower power processor(s) in each of one or more of the sensors, respectively, for executing the relatively less complex individual-sensor tilt test. To reduce power consumption, the (a) relatively higher power processor may operate by default in sleep or low power mode and, when the (b) relatively lower power processor(s) detect a tilt, may trigger the (a) relatively higher power processor to wake-up to perform the open package test. Additionally or alternatively, the sensor system may send raw orientation readings to a remote server to perform the tilt and/or open package test. When the system tests positive for both the tilt and open package tests, the local package-mounted device or remote server may send, via a wireless communication circuit, an indication of an open package, such as, a remote security alarm and package identification (ID), to a predefined alert list (e.g., a central administrator or security device, a remote server or cloud, a user web profile, email(s), telephone number(s), etc.).

Whereas the open package test may be performed locally or remotely (e.g., at a server based on raw orientation signals transmitted from the sensors), in some embodiments, it may reduce overall power consumption to perform the test locally as, in some configurations, the processor uses relatively less power to perform the test than the wireless communication circuit uses to transmitting wireless signals to the server. In other embodiments, the test may be performed remotely.

Figure 1B:
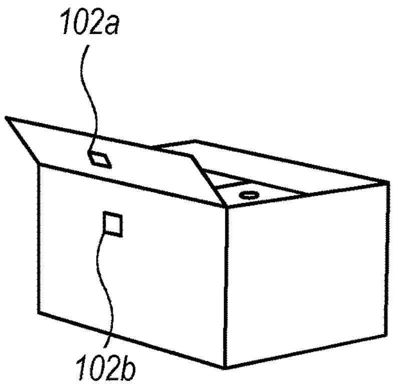
Figure 2A:
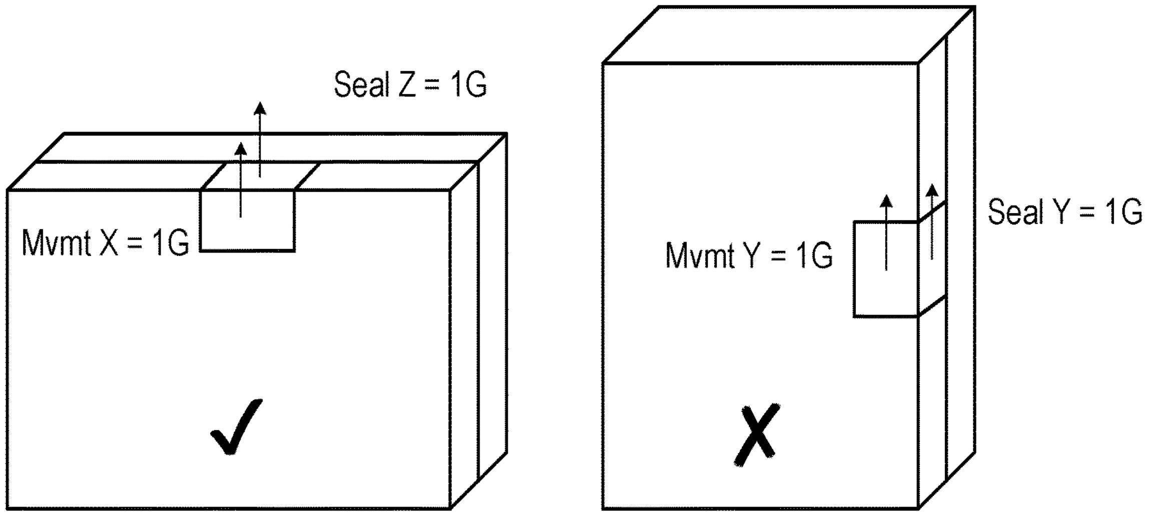
FIGS. 2A-2B schematically illustrate a triple sensor system for detecting opening of a package in all orientations, according to an embodiment of the invention.
Figure 2B:
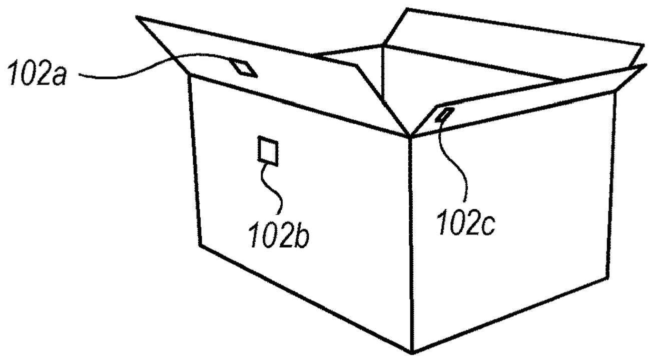

The sensor system may be integrated into a single package-mounted device (e.g., FIGS. 2A and 3) or may comprise multiple independent package-mounted device (e.g., FIGS. 1A, 1B and 2B). The sensor system may comprise two sensors (e.g., FIGS. 1A, 1B, 2A and 3), three sensors (e.g., FIG. 2B), or more than three sensors, each independently measuring orientation. The open package test may be performed for a pair of sensors. When three or more sensors are used, the open package test may measure pair-wise relative orientations between two surfaces and conduct pair-wise open package tests for each of two or more of the pairs of sensors (e.g., a single or multiple open surfaces may indicate the package is open). Relative orientations between two sensor-mounted surfaces may be determined, e.g., based on surface differences in 3D acceleration due to gravity, based on differences in angles between surfaces (e.g., as disclosed in reference to FIG. 6) and/or other methods.

In one embodiment, the open package test may measure the relative orientation between two sensor-mounted surfaces based on accelerometer readings. The relative orientation between closed perpendicular surfaces may be calculated, for example, by summing the differences between the gravity acting on two or more sensors in each axis. The sum is relatively greater when the sensor surfaces are perpendicular to each other and relatively smaller when the sensor surfaces are parallel to each other. Accordingly, the open package test may determine a package is open if $\text{Diff}(G_{X1}, G_{X2})+\text{Diff}(G_{Y1}, G_{Y2})+\text{Diff}(G_{Z1}, G_{Z2})<\text{THRESHOLD}$ indicating non-perpendicular surfaces; and the package is closed if $\text{Diff}(G_{X1}, G_{X2})+\text{Diff}(G_{Y1}, G_{Y2})+\text{Diff}(G_{Z1}, G_{Z2})>\text{THRESHOLD}$ indicating perpendicular surfaces. All external forces will cancel out since both sensors will sense them. Other equations and/or thresholds may be used, e.g., for packages with surfaces that are non-perpendicular in the closed state.

Figure 6:
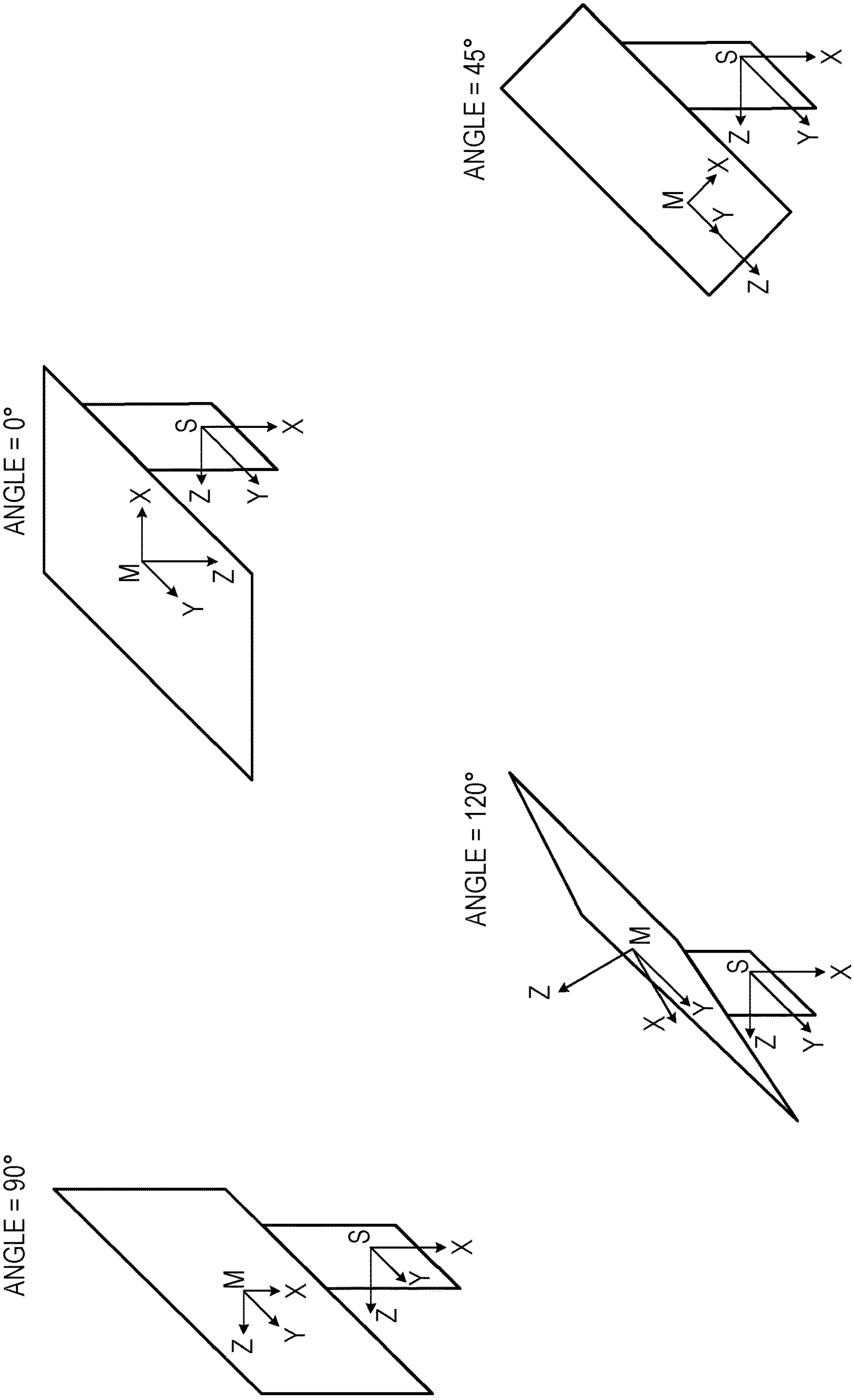
FIG. 6 schematically illustrates a wireless sensor system in various angles and states, according to an embodiment of the invention.

Additionally or alternatively, the open package test may determine an angle between two sensor-mounted surfaces, e.g., based on accelerometer readings. The angle may be calculated between, e.g., the Z and X vectors, of the two surfaces in FIG. 6. If the angle between sensor surfaces is perpendicular, the package is in its closed state. If the angle between sensor surfaces is rotated relative to the closed perpendicular closed state by greater than a threshold (e.g., 45° as shown in FIG. 6), the package is in its open state. In the example of FIG. 6 (and FIG. 3), the angle is measured between vector Z and a vector rotated 90° counter clockwise from vector X on the ZX plane. In this example, the angle measures the opening angle from the closed state of 0° (e.g., Z and rotated X are aligned), where e.g. 45° (the minimum set threshold for the open state) and −90° and +90° refers to an open state. Other equations and/or thresholds may be used, e.g., for packages with surfaces that are non-perpendicular in the closed state, relative to different vectors, planes or coordinate systems, etc.

The open package test may use other techniques and/or computations.

Reference is made to FIGS. 1A-1B, which schematically illustrate a dual sensor system comprising two sensors 102*a* and 102*b* for detecting the opening of a package 100 from a closed state (FIG. 1A) to an open state (FIG. 1B), according to an embodiment of the invention. The sensor system is mounted on an example rectangular box (all package surfaces intersect at substantially perpendicular angles), although any shaped box may be used.

Two sensors 102*a* and 102*b* are mounted to two different respective surfaces of the package. First sensor 102*a* is mounted to an adjustable flap surface intended to open. Second sensor 102*b* is mounted to a side stationary surface not intended to open, although any other surface (e.g., adjustable or stationary) may be used. Sensors 102*a* and 102*b* may be mounted on interior or external surfaces of the package. The sensor system comprises one or more processors that may execute (1) a tilt test for each of one or both sensors, measuring if the individual sensor's tilt deviates from a prior, mean, or initially mounted tilt by more than a predetermined threshold, e.g., in each of one or more dimensions; and (2) an open package test for both sensors combined to compare synchronized orientation readings of the two sensors to determine if a relative orientation between the two sensors is within an open threshold range predefined to indicate the package is open and/or a closed threshold range predefined to indicate the package is closed. In some embodiments, the (1) tilt test is executed first, and only upon a positive tilt test result that the package tilt exceeds the predetermined threshold(s), is the (2) open package test executed. The tilt test may be a relatively simple and low power-consumption test that is initially checked as a necessary but not sufficient condition for package opening (e.g., potentially open), that is subsequently validated by the relatively complex and higher power-consumptive open package test (e.g., verified open). In some embodiments, different processors may execute the tilt and open package tests. For example, a processor operating at a relatively lower power consumption may execute the tilt test and a different processor operating at a relatively higher power consumption may execute the open package test. In some embodiments, the higher power consumption processor may remain in sleep or low power mode until it receives a wake-up signal triggered by the lower power consumption processor determining a positive tilt test result, causing the higher power consumption processor to activate and execute the open package test.

Reference is made to FIGS. 2A-2B, which schematically illustrates a triple sensor system (FIG. 2B) for detecting opening of a package in all orientations (FIG. 2A), according to an embodiment of the invention. In some embodiments, orientation sensors, such as, accelerometers, measure orientation based on Earth's gravity in each dimension (X,Y,Z). Thus, when a package is positioned as shown in FIG. 2A (left), an adjustable surface of a package rotates to open (at least partially) in the direction of the Earth's gravity and so experiences a change in the orientation measurement. For example, when the package is closed, the side sensor's 3D G-force vector is (1G,0,0) and the flap sensor's 3D G-force vector is (0,0,1G), resulting in a relative orientation of $\mathrm{Diff}(G_{X1}, G_{X2})+\mathrm{Diff}(G_{Y1}, G_{Y2})+\mathrm{Diff}(G_{Z1}, G_{Z2})$ that is 2G in the closed state. When this package is open, e.g., so the flap is parallel to its side, the side sensor's 3D G-force vector is (1G,0,0) and the flap sensor's 3D G-force vector is also (1G,0,0), resulting in a relative orientation of $\mathrm{Diff}(G_{X1}, G_{X2})+\mathrm{Diff}(G_{Y1}, G_{Y2})+\mathrm{Diff}(G_{Z1}, G_{Z2})$ that is 0G in the open state. Because the relative orientation changes between the open and closed states, the open package test is able to produce results when the package is positioned as shown in FIG. 2A (left). However, when the package is positioned as shown in FIG. 2A (right), the adjustable surface of a package opens perpendicular to the direction of the Earth's gravity and so does not produce a change in the orientation measurement (both the closed and open flap sensor's 3D G-force vector is (0,1G,0)). To solve this problem and test if the package is open in any orientation, the package shown in FIG. 2B comprises at least three sensors configured to be mounted to three different surfaces each pair of which are not co-planar. Because the adjustable surfaces are not coplanar (e.g., perpendicular), a change in the G-force will be detected between at least one pair of sensors when opening at least one of the non-coplanar surfaces. Accordingly, a package with three or more non-coplanar mounted sensors is able to test whether the package is open in any package orientation (e.g., including both right and left orientations shown in FIG. 2A).

Figure 3:
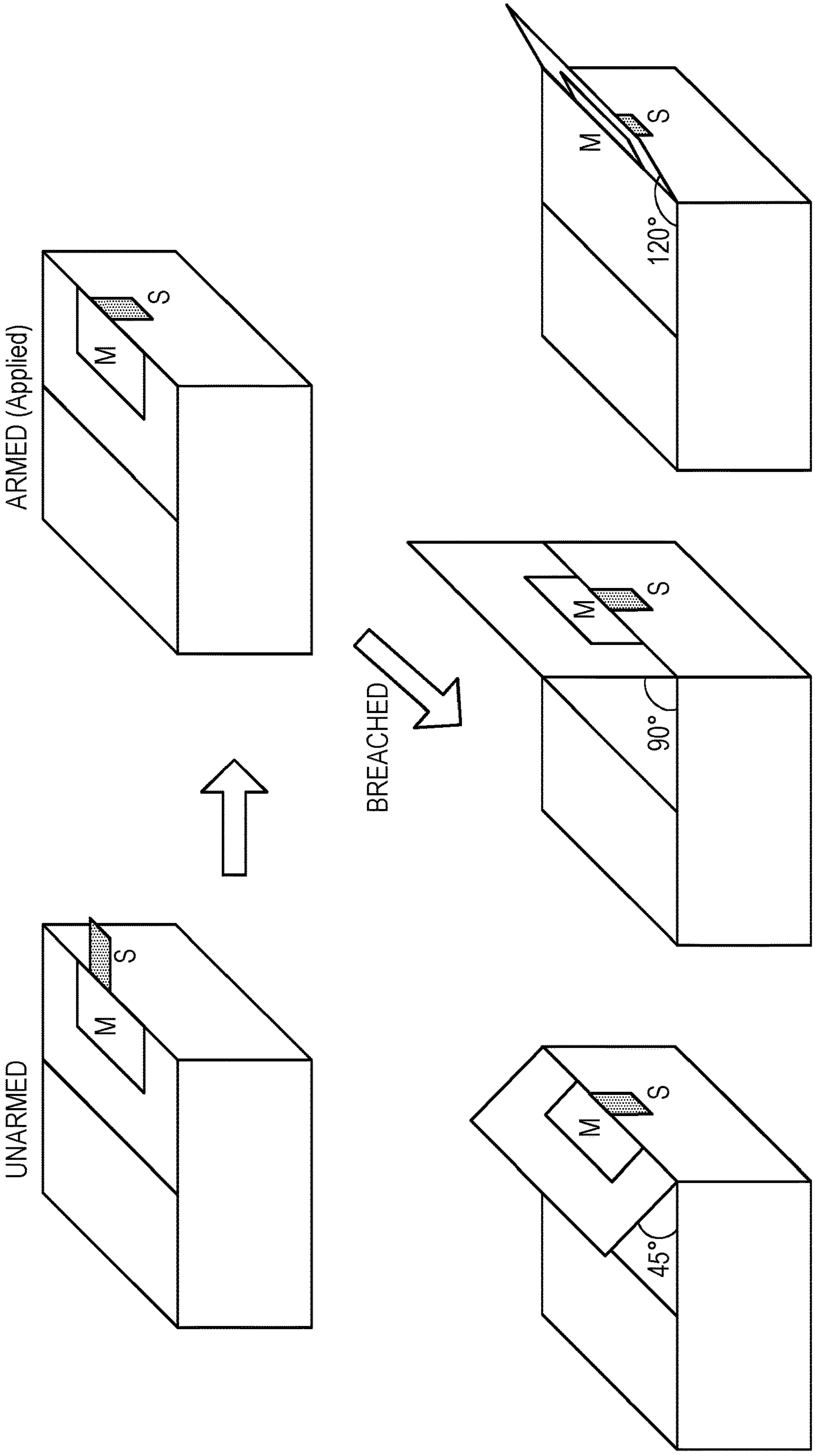
FIG. 3 schematically illustrates a wireless sensor system in an unarmed, armed, and breached states, according to an embodiment of the invention.
Figure 4:
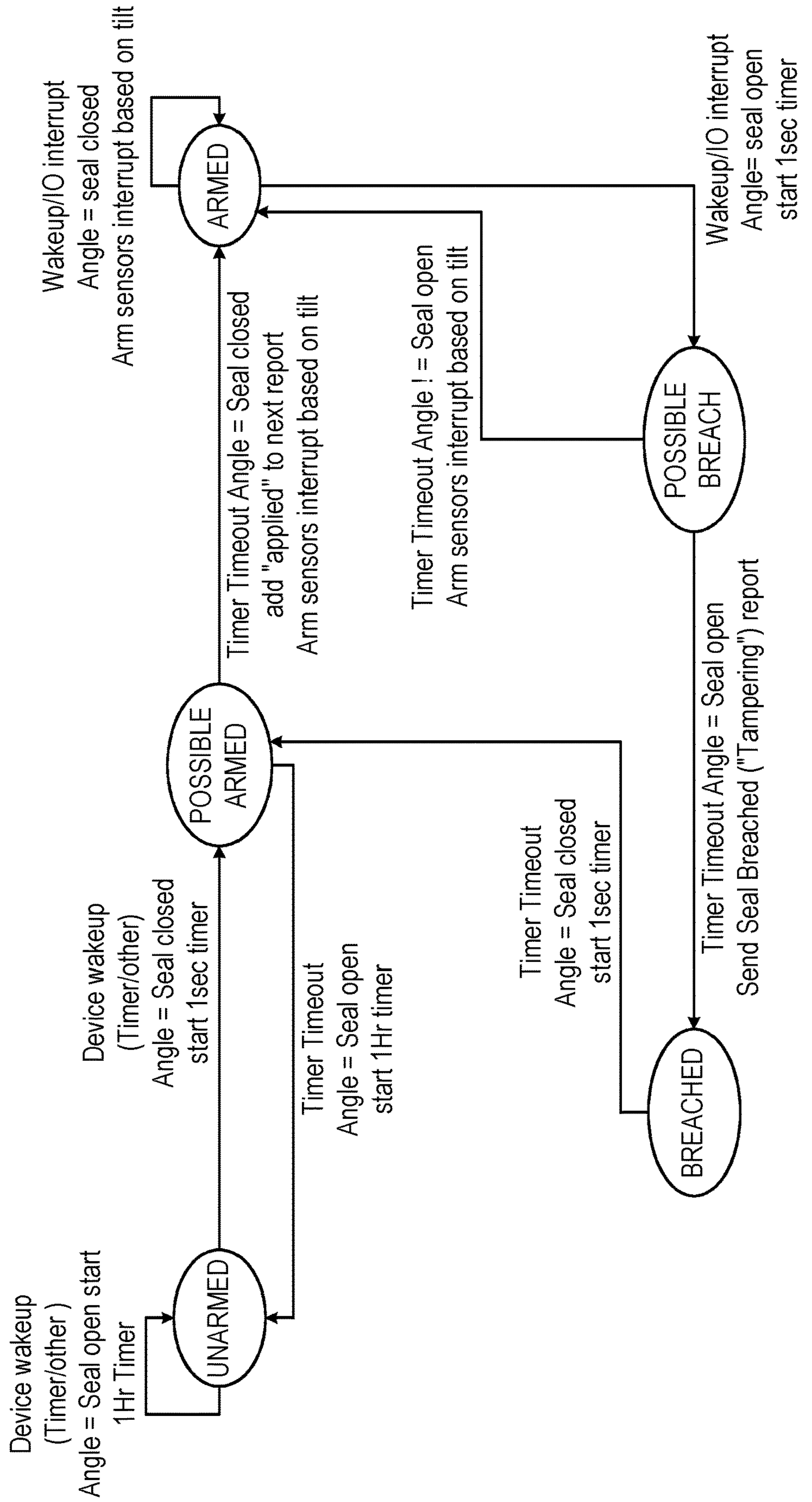
FIGS. 4-5 schematically illustrate data structures for detecting a package opening using multiple sensor comparison, according to an embodiment of the invention.

Reference is made to FIG. 3, which schematically illustrates a sensor system in an unarmed, armed, and breached states; and FIG. 4, which schematically illustrates data structures for operating the sensor system to detect those states, according to some embodiments of the invention. An open indication or breached state may be detected by the sensor system progressing through a sequence of these states based on comparisons of relative orientation(s) between the multiple sensors attached to an item or package being tracked. Based on these comparisons, the sensor system may run a state machine, with for example, the following states:

Unarmed—The sensor system may initially be in the unarmed state. Once the sensor system is activated (e.g., by peeling the package-mounted device), the system wakes up for the first time in this state. A timer is activated during which time, the sensors may be polled for orientation data at a first predetermined frequency (e.g., every integer number of X minutes) for a first predetermined period of time (e.g., integer number Y hours). The sensor system may wake-up a processor (e.g., a CPU) to execute the open package test at that frequency based on synchronized samples from the multiple sensors to determine if the package is open or closed. In one example, the sensor system may initially be a flat package-mounted device with aligned sensors that measure similar orientations (e.g., angle or acceleration due to Earth's gravity) resulting in a small or null relative orientation in the initial unarmed state and once applied to the closed package (e.g., on non-parallel surfaces, such as, perpendicular surfaces), the relative orientation increases in the closed state. If the package is closed at this stage, the sensor system may switch to the armed state (or possible armed state).

Possible Armed (transitional stage)—Before the state machine progresses from the unarmed to the armed state, in this state, the open package test is re-run to verify and validate that the package is still closed. This stage may be repeated any number of times or over any duration to switch to the armed state. If the package is closed at this stage, the sensor system may switch to the armed state. In various embodiments, the possible armed state may be executed or skipped. Upon switching to the armed state, the sensor system may send a wireless notification (e.g., "device applied" or "armed") with a sensor identifier to a remote device.

Armed (applied to package)—The sensor system may progress to this logical state after the unarmed state, e.g., upon detecting sensors are in a closed configuration. In some embodiments, detecting the closed state may be a two-part test comprising (1) a tilt test and (2) an open package test. The tilt test may be run using a first lower-power processor while a second higher-power processor sleep and is woken upon a positive tilt test result. After this, the higher-power processor may execute the open package test to verify the package is open. If so, the sensor system may switch to the breached state (or possible breached state).

Breached—The sensor system may progress to this logical state after the armed state, when the open package test detects an open relative orientation (switching from the closed armed state to the open breached or possible breached state).

Possible Breach (transitional stage)—Before the state machine progresses from the armed to the breached state, in this state, the open package test is re-run to verify and validate that the package is still open. This stage may be repeated any number of times or over any duration to switch to the breached state. If the package is closed at this stage, the sensor system may return to the armed state, but if the package is open, switches to the breached state. In various embodiments, the possible breached state may be executed or skipped. Upon switching to the breached state, the sensor system may send a wireless notification (e.g., "Tampering" or "Breached") with a sensor identifier to a remote device.

In the breached state, the device may wake up and re-run the open package test. If the package is still open, the system may remain in the breached state and/or send additional notifications. If the package is closed, however, the system may wake up the device and switch back to the armed or possible armed states.

Figure 5:
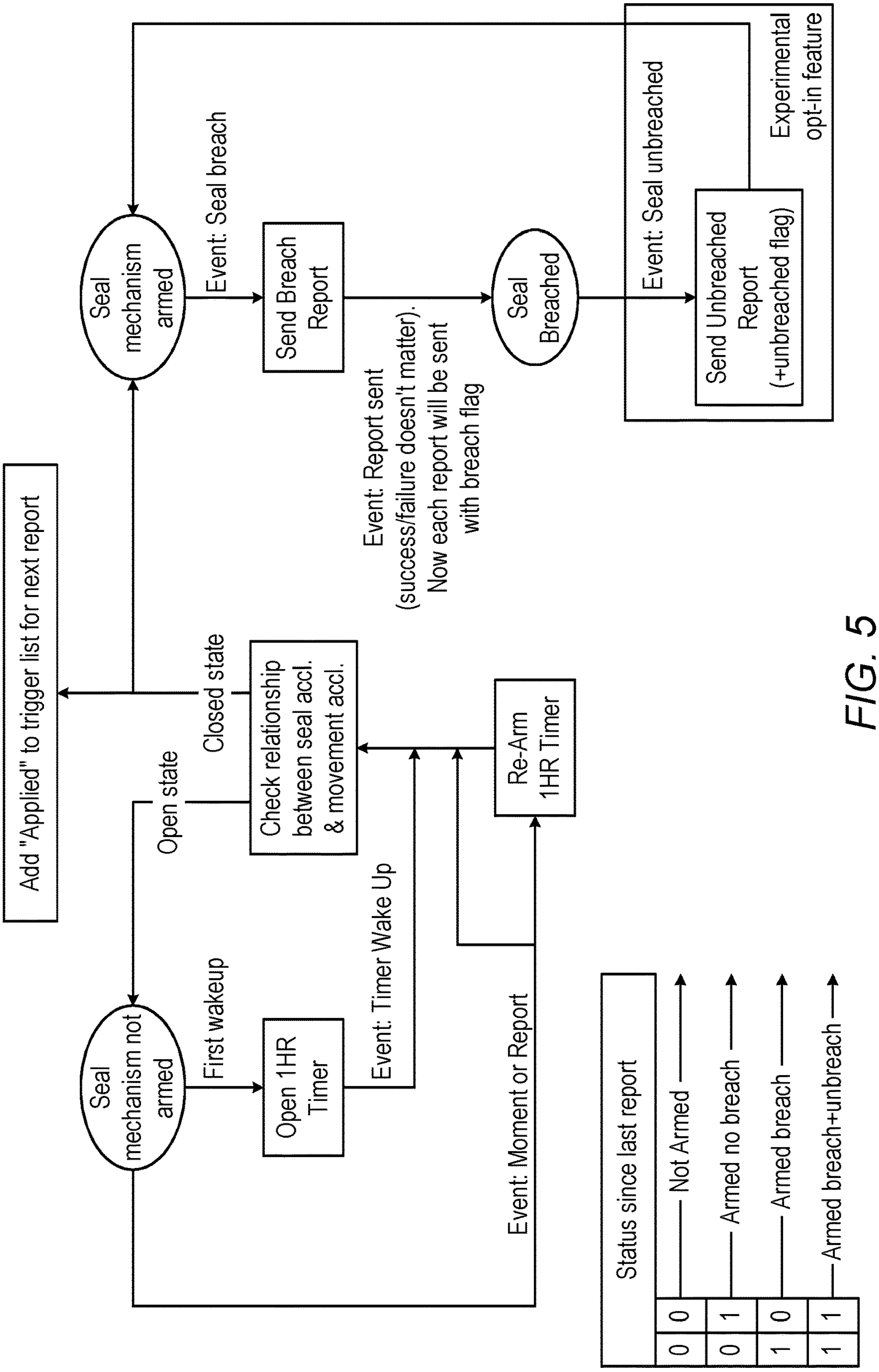

Reference is made to FIG. 5, which schematically illustrates data structures for operating a sensor system, according to an embodiment of the invention.

Open indication arming—The sensor system operation may initiate at "Seal mechanism not armed." The sensors may be activated and, since sensors are often armed close to the time of activation, a first wake up signal may initiate a timer with a relatively high frequency of executing an arming check. A person may activate the sensors and attach them to the package. During this time, the sensors may be polled for orientation data at a first predetermined frequency (e.g., every integer number of X minutes) to detect arming for a first predetermined period of time (e.g., integer number Y hours). After the first predetermined period of time, the sensors may be polled for detecting arming (only) upon receiving a processor (e.g., a central processing unit (CPU)) wake up. When the open indication is armed and the "closed" configuration is detected, a dedicated message may be sent (e.g., to the cloud) to identify "Device Applied" and the time the package-mounted device was applied to the closed package. This information can be used to detect various supply chain parameters and performance indicators.

Wake up for open indication check—since waking up has a relatively high cost of power, the occurrences of wake ups may be minimized, for example, (only) upon detecting a positive tilt test result. An interrupt signal may thus be generated only when the orientation of the package changes (e.g., when the package is tilted or opened) and not when the package is simply moved. To determine tilt, the axis with the highest absolute value may be used among the three axes and a threshold that is Z % less than its value may be used as a threshold condition for the interrupt. The open package test may only be activated when either a tilt or a free-fall occurs (e.g., both generally less common than regular movement).

Open breach check—The difference in orientation or angle between two or more sensors may be computed for each axis. The sum may be relatively large if the sensors are perpendicular to each other and relatively small when they are parallel:

$$\text{Diff}(X1,X2)+\text{Diff}(Y1,Y2)+\text{Diff}(Z1,Z2)<\text{THRESHOLD}\rightarrow \textit{Non}\text{-perpendicular (breached)}$$

$$\text{Diff}(X1,X2)+\text{Diff}(Y1,Y2)+\text{Diff}(Z1,Z2)>=\text{THRESHOLD}\rightarrow\text{Perpendicular (closed)}$$

External forces typically cancel in the above equations since all sensors on the same package senses them equally. Open/closed package tests detect (only) a difference in orientation, not forces between the two sensors.

Once opened, if the package flaps or door is closed again, the closed configuration will be detected and the report about this situation sent to the cloud, in this way multiple openings and closings can be detected.

All parameters can be remotely configured by a cloud based device management solution and optimized based on specific application parameters, data analysis of historical data etc.

Other states or orders of states may be used than shown in FIGS. 4-5.

Reference is made to FIG. 6, which schematically illustrates a sensor system in various angles and states, according to an embodiment of the invention. The sensor system comprises a first sensor (e.g., a movement accelerometer, denoted "M" in the figure, mounted to an adjustable surface intended to open) and a second sensor (e.g., a seal accelerometer, denoted "S" in the figure, mounted to a stationary surface). The sensor system may determine the angle between the first and second sensors (e.g., as the angle between the seal accelerometer ZX vector to the movement accelerometer 90 degrees rotated ZX vector). The sensor system may compare this sensor angle to an angle threshold (e.g., set by cloud configuration, such as, 45 degrees). When the sensor angle is greater than or equal to the threshold, the package is determined to be open and when the sensor angle is less than the threshold, the package is determined to be closed. FIG. 6, left to right, shows the sensor system with its two sensors at a 90° angle, 120° angle, 0° angle and 45° angle.

An open seal may be determined on the condition(s) that the sensor system does not detect a transient (or detects a steady state) or undetermined state (or detects a determined state).

A transient state may be a state in which the sensors are in motion and thus, their measurements cannot be used to sufficiently determine the seal state. Upon detecting a transient state, the sensor system may retry again after a relatively short predefined time period to detect a steady state (with no or below threshold movement). The transient state may be detected in the following cases, for example, as follows:

Case 1: free fall: If any of the accelerometers' total magnitude (e.g., three axis combined) is less than a free fall threshold (e.g., $|(G_{X1}, G_{Y1}, G_{Z2})|$<threshold or $|(G_{X2}, G_{Y2}, G_{Z2})|$<threshold, such as a 900 mg threshold), the device may be in a free fall state—and thus determined to be in a transient state.

Case 2: Significant difference in force over Y axis: In some configurations, both accelerometers should experience the same or similar forces over their Y axis if their measurements are synchronized because they are aligned on that axis (see e.g., FIG. 6). If there is an above threshold difference between their Y axis force (e.g., DIFF(Y1, Y2)>threshold), the device may be determined to be in a transient state.

Case 3: Significant difference in magnitude: In some configurations, both accelerometers should experience the same or similar force magnitude if their measurements are synchronized. If there is an above threshold difference in the force magnitude experienced by the sensors, the device may be determined to be in a transient state.

An undetermined state may be a state in which the sensors cannot be used to determine the seal state, for example, when the package is positioned as shown in FIG. 2A (right), the adjustable surface of a package opens perpendicular to the direction of the Earth's gravity and so does not produce a significant change in the orientation measurement, e.g., to detect the angle over the XZ vectors as the Y axis experiences almost all of the G-force.

Embodiments of the invention may arm the accelerometers interrupt to detect tilt indicating a suspected seal open state. In the armed state, at each instance of an IO interrupt/timer/other in the figure, the seal state may be determined, for example, according to the following cases.

Case 1: Seal closed. In this case, the sensor system receives an interrupt signal that triggers it to execute the tilt test to detect an above threshold (e.g., >30 degrees) tilt. To detect an above threshold tilt, the device may determine, at each of one or more of the sensors, the highest axis (e.g., X or Z). If X is the highest axis, the device may arm interrupt to ½ of the other sensor's Z as a threshold and activate interrupt when X is low and Z is high.

If Z is sensor's the highest axis, the device may arm interrupt to ½ of the other sensor's X as a threshold and activate interrupt when Z is low and X is high.

Case 2: Undetermined state. In this case, the interrupt may be set to detect when the device is in a determined state able to determine the angle between sensor.

In one example, the device may be in an undetermined state as shown in the right image of FIG. 2A, e.g., when the Y axis has almost a full G force. On each sensor, the threshold may be set e.g., to 0.8G, when Y is low.

Figure 7:
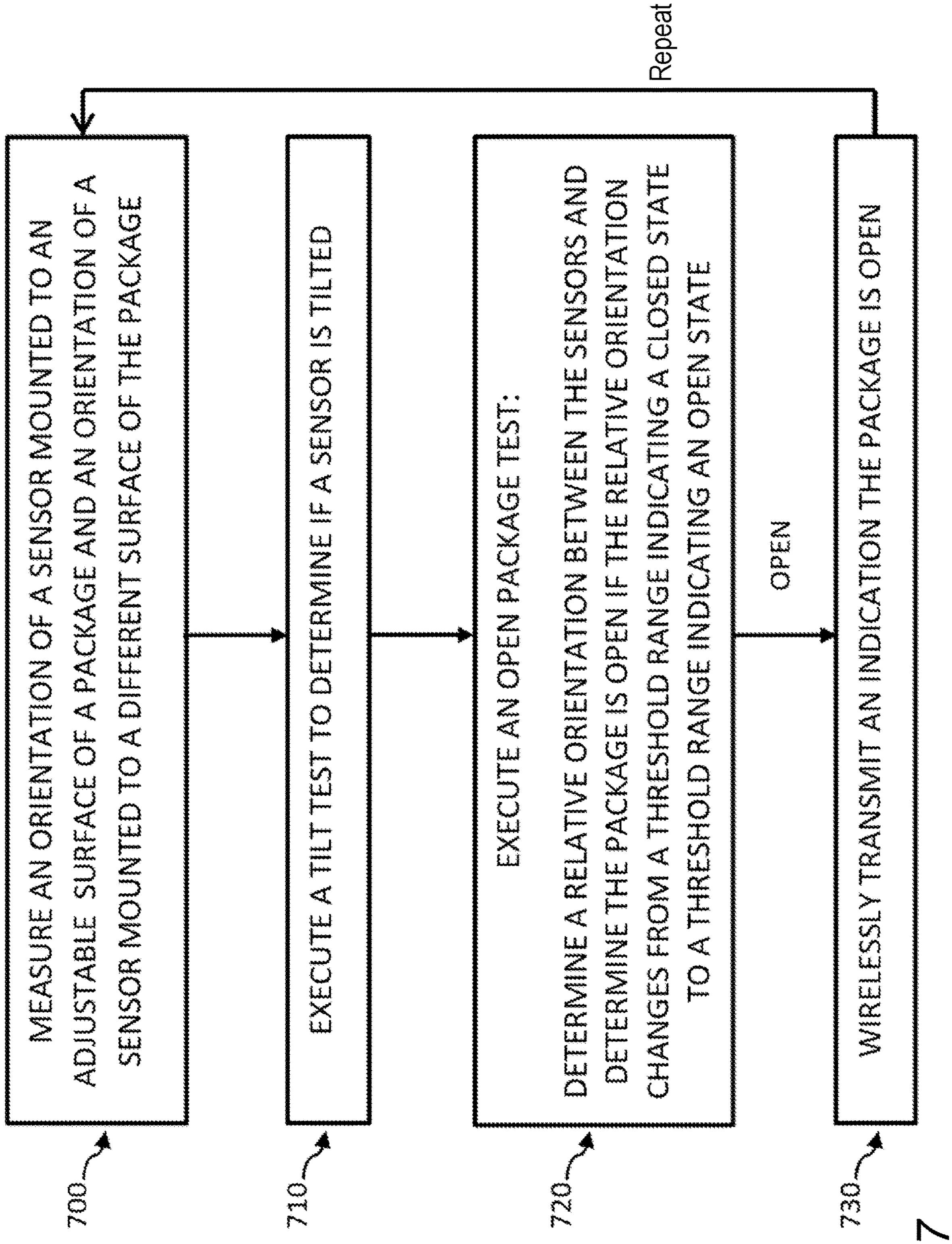
FIG. 7 is a flowchart of a method for detecting a package opening using multiple sensor comparison, according to an embodiment of the invention.

Reference is made to FIG. 7, which is a flowchart of a method for detecting a package opening using multiple sensor comparison, according to an embodiment of the invention. Operations described in reference to FIG. 7 may be executed using devices, data structures and/or embodiments described in reference to FIGS. 1-6.

In operation 700, a process or processor may measure, at each of a plurality of sensors mounted to a plurality of different respective surfaces of the package, an orientation of the surface onto which the sensor is mounted. At least one of the sensors may be mounted to an adjustable surface intended to open the package, such as a package flap.

In operation 710, a process or processor may execute a tilt test to determine if at least one of the plurality of sensors is tilted. In some embodiments the tilt test may determine if the measured orientation of each individual one or more of the plurality of sensors deviates from an initial mounted orientation along one or more dimensions by greater than one or more threshold(s). If the sensor(s) are tilted, the process or processor may proceed to operation 720.

In operation 720, a process or processor may execute an open package test. The open package test may include determining a relative orientation between the sensor mounted to the adjustable surface and another of the plurality of sensors mounted to another of the plurality of different respective surfaces. In some embodiments, the relative orientation may be determined based on differences between gravity acting on the sensors in each of three dimensions. Additionally or alternatively, the relative orientation may be determined based on an angle between the orientation of the surfaces onto which the sensors are mounted. The relative orientation may be determined based on the measures of orientation of the sensors sampled at synchronized times. In some embodiments, the relative orientation may be determined in three dimensions using at least three sensors mounted to three different surfaces each pair of which are not co-planar (e.g., FIG. 2B). In some embodiments, only two sensors may be used (e.g., FIGS. 1A and 1B). The open package test may then determine the package is open if the relative orientation changes from a threshold range indicating a closed state to a threshold range indicating an open state. If so, the process or processor may proceed to operation 730.

In some embodiments, the open package test of operation 720 may only be executed upon the tilt test of operation 710 detecting that the at least one sensor is tilted.

In some embodiment, the tilt test of operation 710 may be executed at a first processor operating at a first power consumption and the open package test of operation 720 may be executed at a second processor operating at a second power consumption that is relatively higher than the first power consumption. The second processor may operate in a low power mode until the second processor receives a wake-up signal triggered by the first processor tilt test detecting that the at least one sensor is tilted. Upon receiving the wake-up signal, the second processor may wake up out of low power mode to execute the open package test.

In operation 730, upon determining the package is in an open state, a process or processor may wirelessly transmit an indication that the package is open.

After executing operation 730, a process or processor may repeat operations 700-730, e.g., periodically or upon detection of a test trigger.

Other operations or orders of operations may be used. For example, the tilt test operation 710 may be skipped in some cases, iterations, or entirely.

Some embodiments may provide the following features:

Unique setup of dual, triple or any number of multiple sensors.

Unique logic to defer between opening scenario and other scenarios (e.g., distinguishing package tilt, movement or hit)

Cloud configuration to optimize the detection logic based on customer setup with defined application angles and sensitivity levels.

Solution optimization based on cloud data analysis of real world result with true and false results enabling tweaks in the algorithm thresholds.

Some embodiments may provide improvements including:

Package breach without monitoring cutting a physical seal.

Discrete opening sensors may be hidden (e.g., on the interior of the package or under a decoy tracker device), unlike a physically seal which can be easily noticed and bypassed by a malicious entity.

Can be installed on the outside of a package so it can be easily applied in packaging lines and on packages that are sterile and should not be opened by shipper (e.g., unlike a light detection sensor).

Ability to detect multiple opening events for the same shipments (e.g., open for customs inspection and closed again).

Ability to work in all lightning conditions (unlike a light sensor).

Any test disclosed herein (e.g., tilt test, open package test, threshold test, etc.) may be repeated any number of times or over any duration of time (e.g., every integer N minutes for a duration of Y hours) to verify and validate prior test(s).

Sensors can be mounted or attached on an interior or exterior surface of a package, e.g., depending on customer preference and exact opening method, and can also be applied to doors or hatches.

When used herein, "sensor" may also refer to any orientation determining device including accelerometers, gyroscopes and/or magnetometers.

Embodiments of the invention are described in reference to a package shaped as a rectangular prism (having perpendicular abutting surfaces), although any other package shape may be used (having surfaces oriented at any angle). A person of ordinary skilled in the art would readily understand how to use geometry to adapt the aforementioned discussion to such alternative package shapes.

Embodiments of the invention are described the orientation of standard intended operation of a package (e.g., flaps pivot relative to their seam line), and not the unconventional misuse thereof.

It will be understood that packages made of non-rigid material, such as cardboard, may move in non-idealized ways, e.g., due to denting or bending of the package or imperfect angles between package surfaces. Calculations may therefore be subject to approximations (e.g., 10% deviation) of the idealized state.

As used herein, "only" may mean exclusively, almost exclusively such as having less than 1-10% exception or with a number of exceptions that is less than a small proportion thereof; occurring in greater than 1-10% of instances or with a number of instances that is greater than a dominant proportion thereof, predominantly, in a majority (>50%) of instances.

In the foregoing description, various aspects of the present invention are described. For purposes of explanation, specific configurations and details are set forth in order to provide a thorough understanding of the present invention. However, it will also be apparent to persons of ordinary skill in the art that the present invention may be practiced without the specific details presented herein. Furthermore, well known features may be omitted or simplified in order not to obscure the present invention.

Unless specifically stated otherwise, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention may include an article such as a computer or processor readable non-transitory storage medium, such as for example a memory, a disk drive, or a USB flash memory device (e.g., memory unit(s)) encoding, including or storing instructions, e.g., computer-executable instructions, which when executed by a processor or controller (e.g., controller(s) or processor(s), such as CPU(s)), cause the processor or controller to carry out methods disclosed herein.

Different embodiments are disclosed herein. Features of certain embodiments may be combined with features of other embodiments; thus certain embodiments may be combinations of features of multiple embodiments.

The foregoing description of the embodiments of the invention has been presented for the purposes of illustration and description. It is not intended to be exhaustive or to limit the invention to the precise form disclosed. It should be appreciated by persons of ordinary skill in the art that many modifications, variations, substitutions, changes, and equivalents are possible in light of the above teaching. For example, it should be appreciated that sign conventions are equivalent and that embodiments of the invention in which values are above a lower bound or threshold are equivalent to embodiments of the invention in which values are below an upper bound or threshold, since the difference is a mere convention of sign. It is, therefore, to be understood that the appended claims are intended to cover all such modifications and changes as fall within the true spirit of the invention.

The invention claimed is:

1. A system for detecting an opening of a package, the system comprising:

at least three sensors configured to be mounted to three different respective surfaces of the package, wherein each pair of the three different surfaces are not coplanar, wherein at least one of the sensors is mounted to an adjustable surface intended to open the package;

one or more processors configured to:

measure an orientation of each of the three different surfaces onto which the at least three respective sensors are mounted, execute an open package test comprising:

determining a relative orientation in three dimensions between the at least one of the sensors mounted to the adjustable surface and different respective ones of the at least three sensors mounted to the three different respective surfaces, and determining the package is open if the relative orientation changes from a threshold range indicating a closed state to a threshold range indicating an open state; and one or more wireless communication circuits configured to wirelessly transmit an indication of the determination that the package is open.

2. The system of claim 1, wherein the one or more processors are configured to:

execute a tilt test to determine if at least one of the plurality of sensors is tilted, and only upon the tilt test detecting that the at least one sensor is tilted, execute the open package test.

3. The system of claim 2, wherein the one or more processors comprise:

a first processor operating at a first power consumption, wherein the first processor executes the tilt test; and a second processor operating at a second power consumption that is relatively higher than the first power consumption, wherein the second processor operates in a low power mode until the second processor receives a wake-up signal triggered by the first processor tilt test detecting that the at least one sensor is tilted, causing the second processor to wake up and execute the open package test.

4. The system of claim 2, wherein the one or more processors are configured to execute the tilt test by determining if the measured orientation of each individual one or more of the plurality of sensors deviates from an initial mounted orientation along one or more dimensions by greater than one or more threshold(s).

5. The system of claim 1, wherein the one or more processors are configured to determine the relative orientation based on differences between gravity acting on the sensors in each of three dimensions.

6. The system of claim 1, wherein the one or more processors are configured to determine the relative orientation based on an angle between the orientation of the surfaces onto which the sensors are mounted.

7. The system of claim 1, wherein the one or more processors are configured to determine the relative orientation based on the measures of orientation of the plurality of sensors sampled at synchronized times.

8. The system of claim 1, wherein the one or more processors are configured to switch operating states from an unarmed state to an armed state to a breached state.

9. The system of claim 1, wherein the plurality of sensors comprises at least two accelerometers.

10. A method for detecting an opening of a package, the method comprising:

at each of at least three sensors mounted to three different respective surfaces of the package, wherein each pair of the three different surfaces are not co-planar, measuring an orientation of each of the three different surfaces onto which the at least three respective sensors are mounted, wherein at least one of the sensors is mounted to an adjustable surface intended to open the package;

executing an open package test comprising:

determining a relative orientation in three dimensions between the at least one of the sensors mounted to the adjustable surface and different respective ones of the at least three sensors mounted to the three different respective surfaces, and determining the package is open if the relative orientation changes from a threshold range indicating a closed state to a threshold range indicating an open state; and wirelessly transmitting an indication of the determination that the package is open.

11. The method of claim 10 comprising:

executing a tilt test to determine if at least one of the plurality of sensors is tilted, and only upon the tilt test detecting that the at least one sensor is tilted, executing the open package test.

12. The method of claim 10 comprising:

at a first processor operating at a first power consumption, executing the tilt test;

at a second processor operating at a second power consumption that is relatively higher than the first power consumption, operating in a low power mode until the second processor receives a wake-up signal triggered by the first processor tilt test detecting that the at least one sensor is tilted; and upon receiving the wake-up signal, waking up the second processor out of low power mode to execute the open package test.

13. The method of claim 10, wherein executing the tilt test comprises determining if the measured orientation of each individual one or more of the plurality of sensors deviates from an initial mounted orientation along one or more dimensions by greater than one or more threshold(s).

14. The method of claim 10, wherein the relative orientation is determined based on differences between gravity acting on the sensors in each of three dimensions.

15. The method of claim 10, wherein the relative orientation is determined based on an angle between the orientation of the surfaces onto which the sensors are mounted.

16. The method of claim 10, wherein the relative orientation is determined based on the measures of orientation of the plurality of sensors sampled at synchronized times.

17. The method of claim 10 comprising switching operating states from an unarmed state to an armed state to a breached state.

18. A non-transitory computer-readable storage medium comprising instructions that when executed cause one or more processors to:

measure an orientation of a surface onto which a sensor is mounted for each of at least three sensors mounted to three different respective surfaces of the package, wherein each pair of the three different surfaces are not co-planar, wherein at least one of the sensors is mounted to an adjustable surface intended to open the package;

execute an open package test comprising:

determining a relative orientation in three dimensions between the at least one of the sensors mounted to the adjustable surface and different respective ones of the at least three sensors mounted to the three different respective surfaces, and determining the package is open if the relative orientation changes from a threshold range indicating a closed state to a threshold range indicating an open state; and wirelessly transmit an indication of the determination that the package is open.

* * * * *